United States Patent
Broers et al.

(10) Patent No.: US 11,168,854 B2
(45) Date of Patent: Nov. 9, 2021

(54) PRECIPITATION SENSING VIA INTELLIGENT LIGHTING

(71) Applicant: SIGNIFY HOLDING B.V., Eindhoven (NL)

(72) Inventors: Harry Broers, 'S-Hertogenbosch (NL); Ruben Rajagopalan, Neuss (DE); Olaf Thomas Johan Antonie Vermeulen, Oss (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 357 days.

(21) Appl. No.: 16/464,399

(22) PCT Filed: Nov. 22, 2017

(86) PCT No.: PCT/EP2017/080007
§ 371 (c)(1),
(2) Date: May 28, 2019

(87) PCT Pub. No.: WO2018/095951
PCT Pub. Date: May 31, 2018

(65) Prior Publication Data
US 2021/0116090 A1    Apr. 22, 2021

(30) Foreign Application Priority Data
Nov. 28, 2016  (EP) .................................... 16200830

(51) Int. Cl.
*G01W 1/14*    (2006.01)
*F21S 10/02*   (2006.01)
(Continued)

(52) U.S. Cl.
CPC ............... *F21S 10/02* (2013.01); *F21S 8/085* (2013.01); *G01P 3/68* (2013.01); *G01W 1/14* (2013.01);
(Continued)

(58) Field of Classification Search
CPC .......... G01W 1/14; G01W 1/00; G01W 1/08; G01W 1/02; G01W 1/10; G01W 1/04;
(Continued)

(56) References Cited

U.S. PATENT DOCUMENTS 3,141,330 A * 7/1964 Murray ................... G01W 1/14
                                                 73/170.17
4,613,938 A    9/1986 Hansen et al.
(Continued)

FOREIGN PATENT DOCUMENTS

CN    103838064 A    6/2014
WO    2005047908 A1  5/2005
(Continued)

*Primary Examiner* — Andre J Allen (57) ABSTRACT

A method (400) for identifying precipitation (50) includes the steps of: providing (410) a lighting unit (10) having a first photosensor (32), a second photosensor (34), and a controller (22), where the first and second photosensors are vertically spaced by a first distance; receiving (430), by the first photosensor, a first light signal from the precipitation at a first time point (T1); receiving (440) by the second photosensor, a second light signal from the precipitation at a second time point (T2); calculating (450) the amount of time between the first light signal and the second light signal; and calculating (460), based on the first distance and the calculated amount of time between the first light signal and the second light signal, a velocity of the precipitation.

12 Claims, 6 Drawing Sheets

(51) Int. Cl.
*F21S 8/08* (2006.01)
*G01P 3/68* (2006.01)
*F21Y 115/10* (2016.01)
*F21W 131/103* (2006.01)
*G01P 5/18* (2006.01)

(52) U.S. Cl.
CPC .... *F21W 2131/103* (2013.01); *F21Y 2115/10* (2016.08); *G01P 5/18* (2013.01)

(58) Field of Classification Search
CPC ........... G01W 1/06; G01W 1/12; G01W 1/16; G01W 2001/003; G01W 2001/006; G01W 2203/00; B60S 1/0822; B60S 1/0825; B60S 1/0818; B60S 1/0888; B60S 1/0859; B60S 1/0866; B60S 1/087; B60S 1/0491; B60S 1/0833; B60S 1/0837; B60S 1/0881; B60S 1/0892
USPC .......................................... 73/170.14–170.28
See application file for complete search history.

(56) References Cited

U.S. PATENT DOCUMENTS

| | | | |
|---|---|---|---|
| 4,820,281 A | 4/1989 | Lawler | |
| 5,528,224 A * | 6/1996 | Wang | G01W 1/14 250/573 |
| 5,847,826 A | 12/1998 | Fukui et al. | |
| 6,597,990 B2 * | 7/2003 | Brown | G01W 1/06 702/3 |
| 6,914,674 B1 | 7/2005 | Wang | |
| 8,818,029 B1 * | 8/2014 | Mecikalski | G01W 1/10 382/103 |
| 10,405,401 B2 * | 9/2019 | Rajagopalan | H05B 47/105 |
| 2003/0069674 A1 * | 4/2003 | Stam | B60S 1/0822 701/36 |
| 2006/0244615 A1 * | 11/2006 | Koors | G01P 5/04 340/601 |
| 2007/0132599 A1 | 6/2007 | DuFaux et al. | |
| 2008/0136361 A1 | 6/2008 | Yoshigoe | |
| 2010/0169017 A1 | 7/2010 | Dufaux et al. | |
| 2011/0054794 A1 | 3/2011 | Teder | |
| 2011/0082619 A1 | 4/2011 | Small et al. | |
| 2014/0239808 A1 * | 8/2014 | Nava | H05B 47/105 315/82 |
| 2015/0035944 A1 | 2/2015 | Gao et al. | |

FOREIGN PATENT DOCUMENTS

| | | |
|---|---|---|
| WO | 2006067513 A1 | 6/2006 |
| WO | 2015167914 A1 | 11/2015 |

* cited by examiner

PRECIPITATION SENSING VIA INTELLIGENT LIGHTING

CROSS-REFERENCE TO PRIOR APPLICATIONS

This application is the U.S. National Phase application under 35 U.S.C. § 371 of International Application No. PCT/EP2017/080007, filed on Nov. 22, 2017, which claims the benefit of European Patent Application No. 16200830.4, filed on Nov. 28, 2016. These applications are hereby incorporated by reference herein.

FIELD OF THE INVENTION

The present disclosure is directed generally to methods and lighting systems configured to detect precipitation, and more specifically, to precipitation detection by outdoor lighting units.

BACKGROUND

The development of smart lighting has resulted in an increasing demand for integrated sensing solutions in lighting systems and luminaires, including presence detection, motion detection, and more. In addition to other smart lighting systems, a wide range of functionalities are being integrated in light poles, ranging from presence sensing for light-control, orientation sensing for luminaire diagnostics, and environmental monitoring. In order to enable large-scale market penetration of intelligent lighting networks, there is also a strong demand for numerous sensing functionalities by integrating a minimal number of sensing modalities.

Precipitation detection is a sensing functionality that may be desirable in lighting systems and luminaires, particularly those situated outside. Existing precipitation detection methods, however, require expensive, dedicated sensor systems. Examples of these dedicated sensor systems include tipping-bucket rain gauges, infrared rain gauges, capacitive rain detectors, acoustic disdrometers, and others. Not only are these dedicated sensor systems expensive, therefore limiting large-scale integration and market penetration, they typically rely on a single modality. As a result, these existing sensors are largely unable to classify the type of precipitation being detected. Rain, drizzle, snow, sleet, hail, and other precipitation types are usually classified only as precipitation.

Accordingly, there is a continued need in the art for affordable and efficient precipitation detection systems which are capable of identifying multiple different forms of precipitation.

SUMMARY OF THE INVENTION

The present disclosure is directed to inventive methods and apparatus for a lighting network configured to provide weather event detection and warning. Various embodiments and implementations herein are directed to a networked lighting system comprising multiple distributed lighting units, such as streetlights, each with an integrated range sensor.

The present disclosure is directed to inventive methods and apparatus for a luminaire configured to detect and identify precipitation. Various embodiments and implementations herein are directed to lighting units, such as streetlights, with an integrated precipitation sensor. The integrated precipitation sensor comprises two spaced photosensors. Precipitation is detected by analyzing light that reflects off of the precipitation and strikes the two photosensors. The delay between detection at an upper photosensor and a lower photosensor provides the terminal velocity of the falling precipitation. The frequency of precipitation detected by the photosensors is a measure of the amount of precipitation. The frequency and terminal velocity information is also used to identify the type of precipitation, as the terminal velocity of precipitation depends on the size of the precipitation element. Accordingly, the terminal velocity of raindrops, sleet, snowflakes, and hail stones will be different.

Generally, in one aspect, a method for detecting precipitation is provided. The method includes the steps of: (i) providing a lighting unit comprising a first photosensor, a second photosensor, and a controller, wherein the first and second photosensors are vertically spaced by a first distance; receiving, by the first photosensor, a first light signal from the precipitation at a first time point (T1); receiving, by the second photosensor, a second light signal from the precipitation at a second time point (T2); calculating, by the controller, the amount of time between the first light signal and the second light signal; and calculating, by the controller based on the first distance and the calculated amount of time between the first light signal and the second light signal, a velocity of the precipitation.

According to an embodiment, the method further includes the step of identifying, based on the velocity of the precipitation, the type of precipitation.

According to an embodiment, the method further includes the step of communicating the identified type of precipitation.

According to an embodiment, the method further includes the step of determining, by the controller based on the received first and second light signals, an intensity of the precipitation.

According to an embodiment, the method further includes the step of modifying, in response to a determined type of precipitation, a light source of the lighting unit. According to an embodiment, the lighting unit further comprises a second light source, and the first light source emits light of a first wavelength and the second light source emits light of a second wavelength.

According to an embodiment, the identification of the type of precipitation comprises a probability.

According to an aspect is a lighting unit configured to detect precipitation. The lighting unit includes: a light source; a first photosensor configured to receive a first light signal from the precipitation at a first time point (T1); a second photosensor configured to receive a second light signal from the precipitation at a second time point (T2), wherein the first and second photosensors are vertically spaced by a first distance; and a controller configured to: (i) calculate an amount of time between the first light signal and the second light signal; and (ii) calculate, based on the first distance and the calculated amount of time between the first light signal and the second light signal, a velocity of the precipitation.

According to an aspect is a lighting unit configured to detect precipitation. The lighting unit includes: a photosensor configured to receive a first reflected light signal from the precipitation at a first time point (T1), and a second reflected light signal from the precipitation at a second time point (T2); first optics configured to direct the first reflected light signal from the precipitation at the first time point to a first portion of the photosensor; second optics configured to direct the second reflected light signal from the precipitation at the second time point to a second portion of the photosensor, wherein the first and second portions of the portion of the photosensor are vertically spaced by a first distance; and a controller configured to: (i) calculate an amount of time between the first light signal and the second light signal; and (ii) calculate, based on the first distance and the calculated amount of time between the first light signal and the second light signal, a velocity of the precipitation.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyroluminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, tribo luminescent sources, sonoluminescent sources, radio luminescent sources, and luminescent polymers.

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a lighting unit or lighting system configured to detect precipitation. More generally, Applicant has recognized and appreciated that it would be beneficial to provide a lighting unit, fixture, network, and system configured to detect precipitation in the vicinity of the lighting unit. A particular goal of utilization of certain embodiments of the present disclosure is to characterize the type of precipitation falling within the vicinity of the lighting unit, and communicate that information.

In view of the foregoing, various embodiments and implementations are directed to a lighting unit or lighting system network comprising a plurality of lighting units, each with two or more integrated photosensors configured to detect light reflecting off of precipitation. The two or more photosensors are preferably vertically spaced in order to obtain information about the terminal velocity of the precipitation. A controller of the lighting unit or the lighting system network evaluates the delay between reflecting light signals detected by the two or more vertically spaced photosensors, and determines the terminal velocity. The lighting unit or lighting system can also determine what type of precipitation is falling based at least in part on the terminal velocity, and can communicate that information to a user, network, or other destination.

Figure 1:
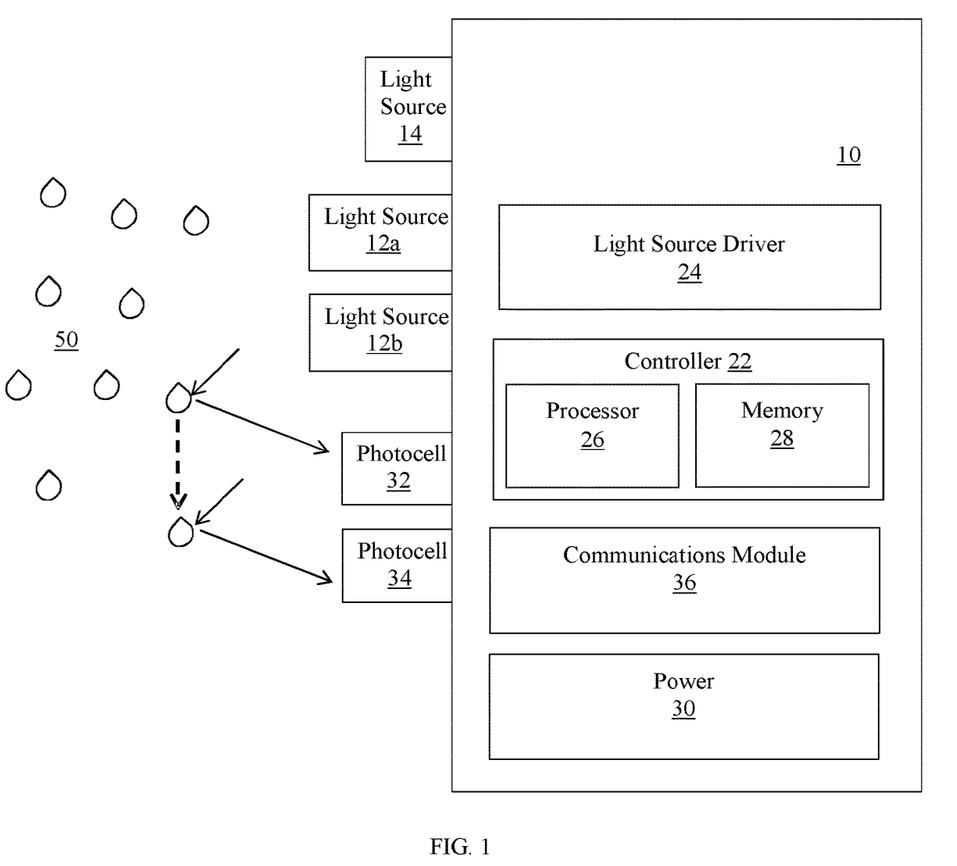
FIG. 1 is a schematic representation of a lighting unit comprising an integrated precipitation sensor, in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a street light, a headlight, or any other exterior lighting unit, fixture, or system. According to an embodiment, lighting unit 10 can be any type of interior lighting unit, such as a night light, table lamp, or any other interior lighting unit, fixture, or system. According to an embodiment, lighting unit 10 is configured to illuminate all or a portion of a target surface within the lighting environment.

According to an embodiment, lighting unit 10 includes a controller 22 that is configured or programmed to output one or more signals to drive the one or more light sources 12a-b and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein. Controller 22 can be programmed, structured and/or configured to cause light source driver 24 to regulate the intensity and/or color temperature of light source 12 based on predetermined data, such as ambient light conditions, among others, as will be explained in greater detail hereinafter. According to one embodiment, controller 22 can also be programmed, structured and/or configured to cause light source driver 24 to regulate the intensity and/or color temperature of light source 12 based on communications received by lighting unit 10.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor that is recharged via a connection to the AC/DC converter and can provide power controller 22 and light source driver 24 when the circuit to AC power source 30 is opened. Lighting unit 10 includes two or more photosensors 32 and 34 which are connected to an input of controller 22 and collect information about precipitation 50 in the vicinity of lighting unit 10. The photosensors or photodetectors can be any photosensors capable of detecting a wavelength of light, including but not limited to visible light, ultraviolet light, and/or infrared. The two or more photosensors 32 and 34 transmit data to controller 22 or externally via a communications module 36. As precipitation 50 falls, at a first time point (T1) light emitted by light source 12 and/or other light sources strikes a droplet, flake, hailstone, or other type of precipitation and is reflected toward the first photosensor 32, as shown in FIG. 1. At a second time point (T2), light emitted by light source 12 and/or other light sources strikes the droplet, flake, hailstone, or other type of precipitation and is reflected toward the second photosensor 34. The controller 22 receives the signal generated by photosensor 32 at T1 and the signal generated by photosensor 34 at T2, calculates the delay between the two signals, and determines based on that delay the terminal velocity of the precipitation 50. The terminal velocity can be utilized to identify the type of precipitation being detected by the lighting unit. Any type of delay calculation method can be used, and according to one embodiment the method comprises statistical measures to reduce the effects of overlapping or missing drops at either sensor. For example, the delay can be determined using a cross correlation between two sequences of T1 and T2 samples. The effect of overlapping/missing drops is inversely proportional to the length of the sequence used.

In some embodiments, photosensors 32 and 34 are remotely located on or near the lighting unit 10 and transmit obtained data to a wired or wireless communications module 36 of the lighting unit. Communications module 36 can be, for example, Wi-Fi, Bluetooth, IR, radio, or near field communication that is positioned in communication with controller 22 or, alternatively, controller 22 can be integrated with communications module 36.

According to an embodiment, lighting unit 10 comprises an additional light source 14, which is configured to enhance the contrast of light signals received by the first and/or second photosensors 32 and 34. For example, additional light source 14 may be a near-infrared light source, which would facilitate detection in low-light conditions. Accordingly, the first and/or second photosensors 32 and 34 may be configured to detect near-infrared light signals generated from the near-infrared light reflecting off of the precipitation. According to an embodiment, one of the first photosensor 32 and the second photosensor 34 can be configured to detect light of a first type, such as visible light, and the other of the first and second photosensors can be configured to detect light of a second type, such as near-infrared light.

Figure 2:
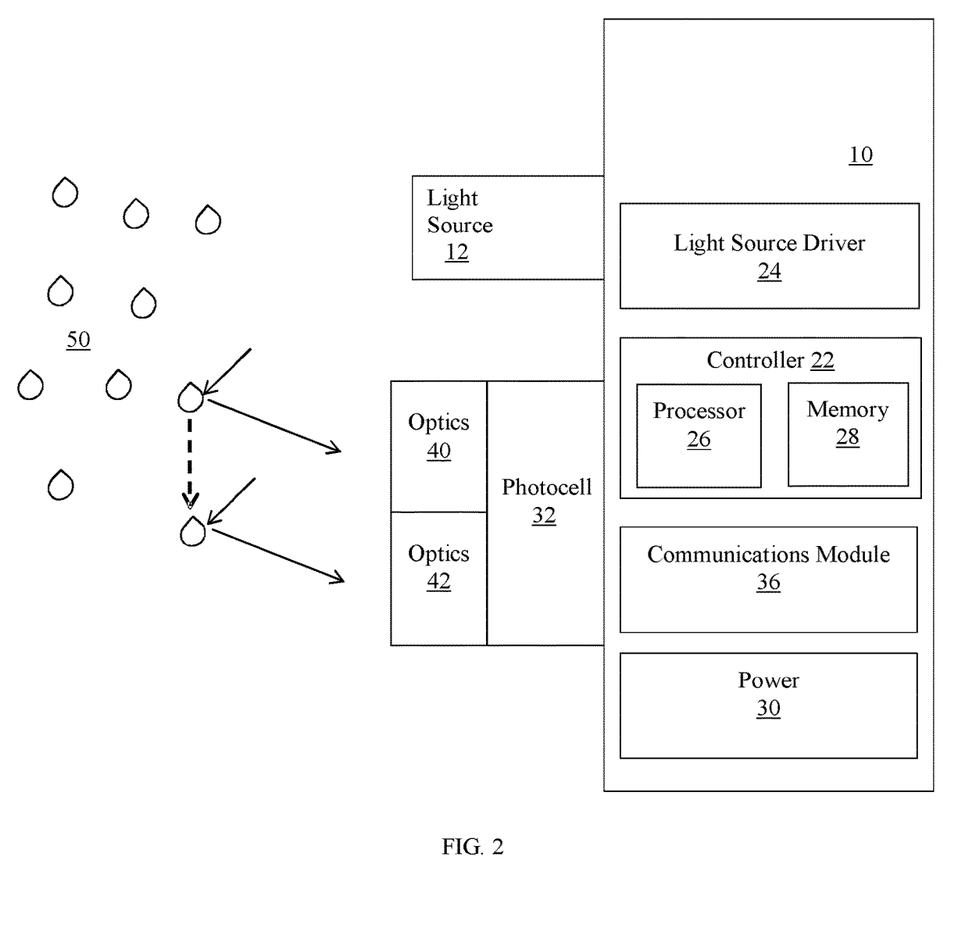
FIG. 2 is a schematic representation of a lighting unit comprising an integrated precipitation sensor, in accordance with an embodiment.

According to an embodiment, lighting unit 10 comprises an optical system that separates the individual field of view of the two or more photosensors. This will help ensure that light signals reflecting off precipitation 50 are detected by photosensor 32 at time T1 and by the same or a different photosensor at T2, thereby enabling accurate calculation of terminal velocity. Referring to FIG. 2, in one embodiment, is an example of a lighting unit 10 including a single photosensor 32 with optics 40 and 42 which separate the field of view of the photosensor, ensuring that light signals reflecting off precipitation 50 are detected by photosensor 32 at time T1 via optics 40 and T2 via optics 42, thereby enabling accurate calculation of terminal velocity. Lighting unit 10 can be any of the embodiments described herein or otherwise envisioned, and can include any of the components of the lighting units described in conjunction with FIG. 1, such as one or more light sources 12, light source driver 24, controller 22, photosensors 32, and wireless communications module 36, among other elements. The photosensor 32 can be any photosensor capable of detecting a wavelength of light, including but not limited to visible light, ultraviolet light, and/or infrared. The photosensor 32 transmits data to controller 22 or externally via a communications module 36. As precipitation 50 falls, at a first time point (T1) light emitted by light source 12 and/or other light sources strikes a droplet, flake, hailstone, or other type of precipitation and is reflected toward the photosensor 32 via optics 40, as shown in FIG. 2. At a second time point (T2), light emitted by light source 12 and/or other light sources strikes the droplet, flake, hailstone, or other type of precipitation and is reflected toward photosensor 32 via optics 42. The controller 22 receives the signal generated by photosensor 32 at T1 and the signal generated by photosensor 32 at T2, calculates the delay between the two signals, and determines based on that delay the terminal velocity of the precipitation 50. The terminal velocity can be utilized to identify the type of precipitation being detected by the lighting unit.

According to an embodiment, the optics 40 and 42 may be any lens, light guide, reflector, or any other optics configured to divide or otherwise separate the field of view of the photosensor 32, ensuring separate detection of the signals at T1 and T2.

Figure 3:
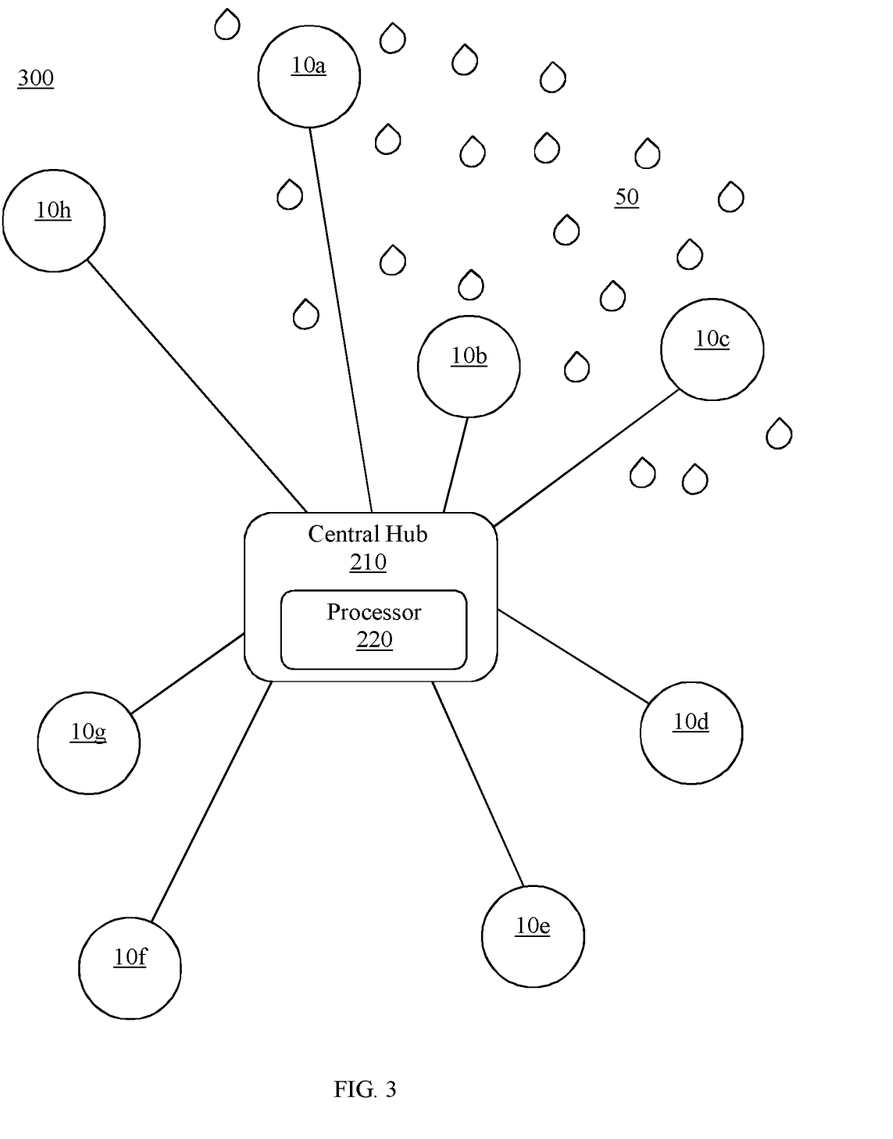
FIG. 3 is a schematic representation of a lighting system, in accordance with an embodiment.

Referring to FIG. 3, in one embodiment, is a distributed lighting system network 200 comprising a plurality of lighting units 10a-h each with a precipitation sensor comprising two or more vertically spaced photosensors 32 and 34 configured to obtain information about precipitation 50. The lighting units can be any of the embodiments described herein or otherwise envisioned, and can include any of the components of the lighting units described in conjunction with FIGS. 1 and 2, such as one or more light sources 12, light source driver 24, controller 22, and wireless communications module 36, among other elements.

The plurality of lighting units 10 can be configured to communicate with each other and/or with a central computer, server, or other central hub 210. One or more aspects of the functionality of the methods and systems described or otherwise envisioned herein may occur within the central hub 210 rather than within the individual lighting units. For example, the central hub may extract information from data captured by one or more lighting units and transmitted or otherwise communicated to the central hub. According to an embodiment, lighting network 200 comprises a central processor 220, which can perform one or more functions of the system. For example, the central hub 210 can comprise a processor 220.

According to an embodiment, the distributed lighting system network 200 comprises a town, village, city, street, parking lot, or any other location. The network may comprise two lighting units or many thousands of lighting units. The network may be implemented in a rural setting, suburban setting, urban setting, or a combination thereof.

As shown in FIG. 3, only a portion of the plurality of lighting units within lighting system network 200 may detect precipitation 50 due to either the size of the network of the movement of precipitation into or out of an area. For example, lighting units 10a, 10b, and 10c in FIG. 2 may detect precipitation while lighting units 10d-10h detect no precipitation.

Figure 4:
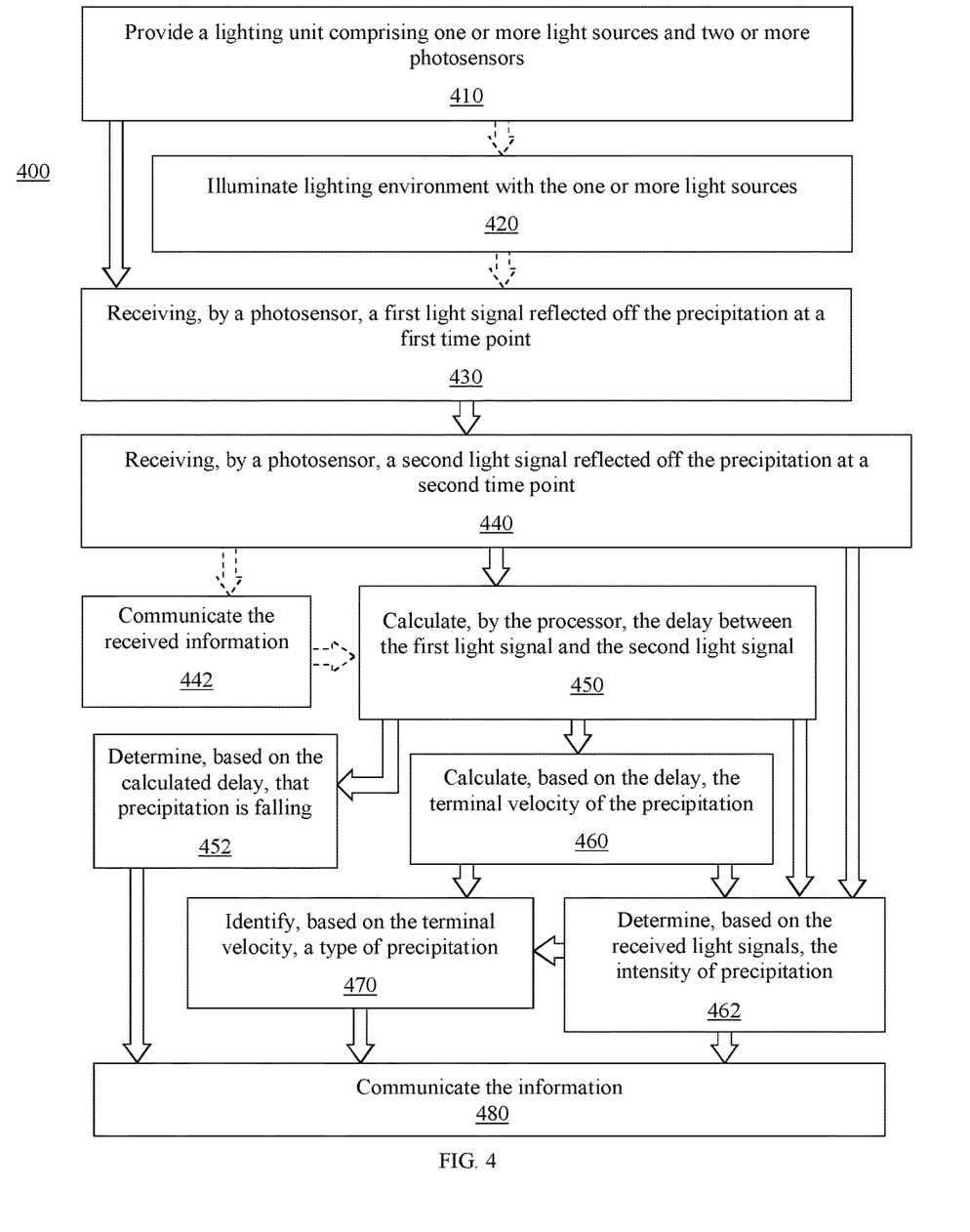
FIG. 4 is a flowchart of a method for detecting precipitation, in accordance with an embodiment.

Referring to FIG. 4, in one embodiment, a flow chart illustrating a method 400 for detecting precipitation by a lighting unit. At step 410 of the method, a lighting unit 10 is provided. Lighting unit 10 can be any of the embodiments described herein or otherwise envisioned, and can include any of the components of the lighting units described in conjunction with FIGS. 1 and 2, such as one or more light sources 12, light source driver 24, controller 22, photosensors 32 and/or 34, and wireless communications module 36, among other elements. According to an embodiment, lighting unit 10 is configured to illuminate all or a portion of a lighting environment.

At optional step 420 of the method, the lighting unit illuminates all or a portion of the lighting environment. According to one embodiment, the lighting unit is an outdoor lighting fixture such as a streetlight, parking lot light, or other lamp post or external lighting fixture configured to illuminate a target surface. The lighting unit may automatically illuminate the lighting environment during a predetermined period, or may be activated and deactivated by activity. According to another embodiment, the lighting unit can detect ambient light levels and based on a predetermined threshold can activate and deactivate the light sources.

At step 430 of the method, the first photosensor 32 of the lighting unit receives a first light signal reflected off the precipitation 50 at a first time point. The light reflecting off the precipitation may be the light emitted by the one or more light sources 12 of the lighting unit, or may be a natural or artificial external light source, including but not limited to sunlight, moonlight, ambient light, other lighting units, household light, and other light sources. First photosensor 32 communicates the received light signal, which is converted by the photosensor to an electrical signal, to the controller 22, where the information can be analyzed and/or can be stored within memory 28. According to another embodiment where the lighting unit comprises a single photosensor 32 and optics 40 and 42, at step 430 of the method the photosensor 32 of the lighting unit receives a first light signal reflected off the precipitation 50 at a first time point, via optics 42.

At step 440 of the method, the second photosensor 34 of the lighting unit receives a second light signal reflected off the precipitation 50 at a second time point. The light reflecting off the precipitation may be the light emitted by the one or more light sources 12 of the lighting unit, or may be a natural or artificial external light source, including but not limited to sunlight, moonlight, ambient light, other lighting units, household light, and other light sources. Second photosensor 32 communicates the received light signal, which is converted by the photosensor to an electrical signal, to the controller 22, where the information can be analyzed and/or can be stored within memory 28. According to another embodiment where the lighting unit comprises a single photosensor 32 and optics 40 and 42, at step 440 of the method the photosensor 32 of the lighting unit receives a second light signal reflected off the precipitation 50 at a second time point, via optics 44.

The first photosensor 32 and/or second photosensor 34 may be configured to receive light signals when desired, programmed, or activated. For example, the photosensors may receive light signals continuously, or the photosensors may receive light signals periodically, such as one every minute or multiple times per minute, among many other periods of time. According to another embodiment, the photosensors can be configured to receive light signals in response to a trigger, and/or the frequency of sampling can be increased in response to the trigger. For example, the lighting unit or network may comprise or be in communication with a weather station or other weather prediction system, and thus may be triggered to receive light signals by the photosensors when any precipitation or other weather event is predicted.

At optional step 442, the photosensor(s) communicate, or controller 22 of lighting unit 10 communicates, the first and second light signals to another lighting unit 10, and/or to a central hub, computer, server, or processor. The lighting unit 10 may be in direct and/or networked wired and/or wireless communication with the other lighting unit 10 and/or the central hub 210. Accordingly, the other lighting unit 10 and/or the central hub 210 may be located nearby or remote from the lighting unit 10.

According to an embodiment, the lighting unit 10 may comprise an additional light source 14, which is configured to enhance the contrast of light signals received by the first and/or second photosensors 32 and 34. For example, additional light source 14 may be a near-infrared light source, which would facilitate detection in low-light conditions. Accordingly, the first and/or second photosensors 32 and 34 may be configured to detect near-infrared light signals generated from the near-infrared light reflecting off of the precipitation.

According to another embodiment, one of the first photosensor 32 and the second photosensor 34 is configured to detect light of a first type, such as visible light, and the other of the first and second photosensors is configured to detect light of a second type, such as near-infrared light. This embodiment requires light sources of the first type and the second type. The use of different light wavelengths helps prevents cross-contamination of the photosensors.

At step 450 of the method, the controller 22 calculates the delay between the first light signal and the second light signal. This can be, for example, a simple calculation by controller 22 of lighting unit 10 to subtract the second time point (T2) from the first time point (T1) to arrive at an amount of time between T1 and T2. For multiple concurrent detected light signals, the information becomes more detailed and the analysis more challenging, but the cross correlation between the two signals will provide the delay between received light signals. According to an embodiment, the determined delay may be an average amount of time between T1 and T2 for precipitation at any given time or interval.

At optional step 452 of the method, lighting unit 10 or lighting system network may determine from the received light signals and/or the calculated delay or average delay that there is precipitation falling in the vicinity of lighting unit 10. In a network of lighting units, some or all of the plurality of lighting units may detect precipitation. Providing a notification of precipitation in the vicinity of a lighting unit may be sufficient information for various embodiments of the systems and methods described herein. As described in step 480, below, the lighting unit may then communicate the information to another lighting unit 10, to a central hub, computer, server, or processor, or to a user.

Figure 5:
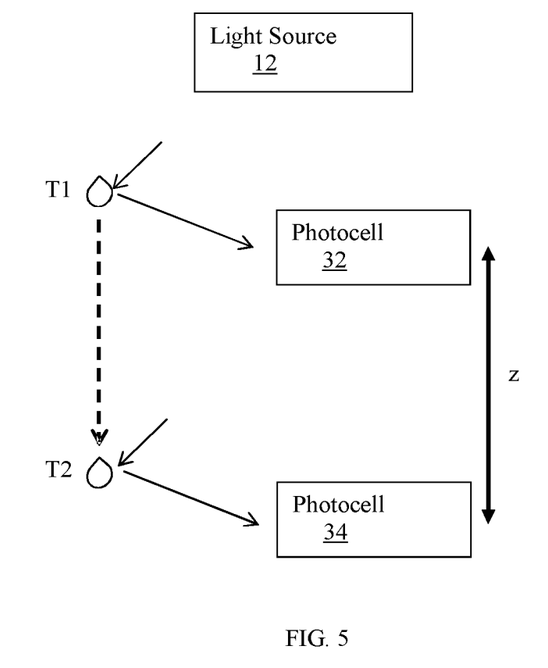
FIG. 5 is a schematic representation of a spaced dual photosensor configuration, in accordance with an embodiment.

At step 460 of the method, the terminal velocity of rain drops, snowflakes, hail stones, or other precipitation can be obtained by measuring the delay between the detected signals of the two vertically spaced photosensors 32 and 34. Because the velocity of the precipitation is constant over the small distance between the spaced photosensors 32 and 34, shown a z in FIG. 5, the time delay between the first light signal and the second light signal is a measurement of velocity. Thus, v (terminal velocity of the precipitation)=z (distance between the spaced photosensors 32 and 34)/t (time delay between the first light signal and the second light signal).

Figure 6:
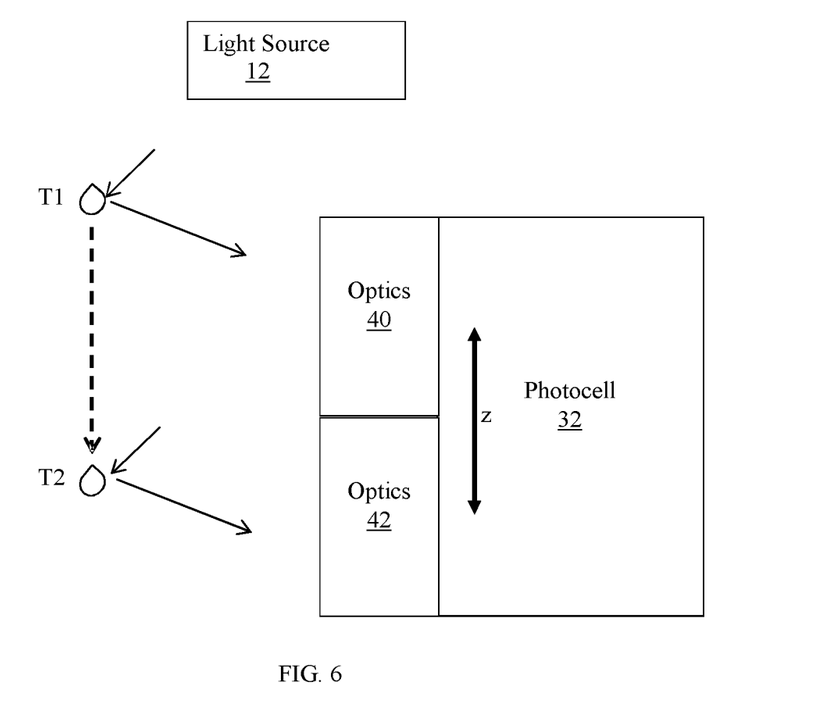
FIG. 6 is a schematic representation of a single photosensor configuration, in accordance with an embodiment.

According to another embodiment shown in FIG. 6, the velocity of the precipitation can be constant over the small distance between the spaced detection of the signal by photosensor 32 made possible by optics 40 and 42 splitting or dividing the field of view of the photosensor, and the time delay between the first light signal and the second light signal will be a measurement of velocity. Thus, v (terminal velocity of the precipitation)=z (distance between the optically-driven T1 and T2 detection by photosensor 32)/t (time delay between the first light signal and the second light signal).

The terminal velocity of an object depends on the size of that objection. Accordingly, the velocity of the precipitation can be utilized to determine the type of precipitation. For example, a typical droplet of rain from a cloud might have a radius of 10 μm and thus have a terminal velocity of 1 cm/s, while a large cloud droplet might have a radius of 50 μm and thus have a terminal velocity of 27 cm/s.

At optional step 462 of the method, the controller uses the frequency of the received first and second light signals to determine the intensity of precipitation falling near lighting unit 10. The determination may be quantitative and/or qualitative. For example, the intensity of precipitation may be qualitatively calculated as light, medium, or heavy. Alternatively, the intensity of precipitation may be quantitatively calculated as millimeters per hour, such as 5 mm/hr. This may be based on a predetermined correlation between the frequency of light signals and known precipitation intensities, or may be based on machine learning to correlate the frequency of light signals and precipitation intensities. Controller 22 may optionally use the calculated delay between first light signals and second light signals, and/or the calculated terminal velocity of the precipitation, in order to determine the intensity of precipitation falling near lighting unit 10. As described in step 480, below, the lighting unit may then communicate the intensity information to another lighting unit 10, to a central hub, computer, server, or processor, or to a user.

At step 470 of the method, controller 22 of lighting unit 10 uses the calculated terminal velocity information, and/or the determined intensity information, to identify the type of precipitation falling in the vicinity of the lighting unit. For example, a very slow terminal velocity may indicate a snowfall, a moderate terminal velocity may indicate a rainfall, and a very fast terminal velocity may indicate a hail storm. The identification may be an absolute identification of one type of precipitation among the possible precipitation options, or the identification may be a probability of one or more types of precipitation.

According to an embodiment, at optional step 452 and/or at any other step of the method, lighting unit 10 or lighting system network 200 may use additional information to help identify the type of precipitation falling in the vicinity of the lighting unit. For example, the lighting unit may also include a thermometer to measure air temperature, thereby adding ambient temperature to the precipitation identification methodology. Another piece of additional information to help identify the type of precipitation falling in the vicinity of the lighting unit may be a date and a prediction of the type of precipitation most likely to fall on a particularly day of the year. Many other types of information or sensor data may be used, including but not limited to humidity, dew point, current pressure, pressure change, and/or other information that could have an impact on some forms of precipitation, such as ice, snow, or water.

In addition to determining the velocity, type, and/or intensity of precipitation, lighting unit 10 or lighting system network 200 may determine the direction of the precipitation from the received light signals. The precipitation may be falling exactly vertically, or may also have a horizontal direction. The lighting unit 10 or lighting system network 200 may determine direction from the received light signals, and may supplement that information with external information such as wind speed and/or direction, among other sources of information.

At step 480 of the method, lighting unit 10 and/or lighting network 200 communicates the determined information to another lighting unit, to a user, to a central hub, a remote server, or a management center. For example, a central hub may comprise or be in communication with a weather station, weather monitor, television station, radio station, or other mechanism in order to provide precipitation information. For example, the information may be broadcast via mobile communication such as an SMS to users, or via wireless communication to a weather station. The communication from lighting unit 10 and/or lighting network 200 may comprise a location of the lighting unit, a unique identifier of the lighting unit, type of precipitation, intensity of precipitation, direction of precipitation, time information, duration of the weather event, historical precipitation information, and/or any other information possessed by the lighting unit or system.

According to an embodiment, lighting unit 10 and/or lighting network 200 can respond to the determined precipitation. The response may be based on a predetermined or pre-programmed threshold or triggering event. For example, a lighting unit 10 may respond to the triggering precipitation by modifying a light source or displaying a light, text, or sound. For example, light signalling may comprise, among other things, changes in the light spectrum (intensity/hue) or beam profile, such as a flashing red light or other alert. As another example, the lighting unit may actively project information on the surface of the precipitation. Many other modifications of the lighting unit and/or other response methods are possible.

Although the vertically spaced dual photosensor configuration envisioned herein is described primarily with regard to a lighting unit or lighting system, it should be appreciated that the configuration may be used in a variety of systems and devices. For example, the vertically spaced dual photosensor configuration may be utilized in vehicles, homes, or a wide variety of other systems in which detection and/or characterization of precipitation is desirable. For example, the vertically spaced dual photosensor configuration may be embodied in a device 10 other than a lighting unit, such as a handheld device, a mobile device, a fixed device, or any of a variety of other devices configured to detect precipitation 50 within an environment. The device will include a first photosensor 32 configured to receive a first light signal from the precipitation at a first time point (T1), and a second photosensor 34 configured to receive a second light signal from the precipitation at a second time point (T2). Pursuant to the vertically spaced dual photosensor configuration, the first and second photosensors are vertically spaced by a known or predetermined first distance. The device further includes a controller 22 that calculates the amount of time between the first light signal and the second light signal, and uses that information together with the known first distance to calculate the velocity of the precipitation. The controller can use the velocity information to identify the type of precipitation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method for detecting precipitation, the method comprising the steps of:
    providing a lighting unit comprising a first photosensor, a second photosensor, and a controller, wherein the first and second photosensors are vertically spaced by a first distance;
    receiving, by the first photosensor, a first light signal from the precipitation at a first time point;
    receiving by the second photosensor, a second light signal from the precipitation at a second time point;
    calculating, by the controller, the amount of time between the first light signal and the second light signal;
    calculating, by the controller based on the first distance and the calculated amount of time between the first light signal and the second light signal, a terminal velocity of the precipitation, and
    identifying, based on the terminal velocity of the precipitation, the type of precipitation.

2. The method of claim 1, further comprising the step of communicating the identified type of precipitation.

3. The method of claim 1, further comprising the step of determining, by the controller based on the received first and second light signals, an intensity of the precipitation.

4. The method of claim 1, further comprising the step of modifying, in response to a determined type of precipitation, a light source of the lighting unit.

5. The method of claim 4, wherein the lighting unit further comprises a second light source, and further wherein the first light source emits light of a first wavelength, and the second light source emits light of a second wavelength.

6. A lighting unit configured to detect precipitation within a lighting environment, the lighting unit comprising:
    a light source;
    a first photosensor configured to receive a first light signal from the precipitation at a first time point;
    a second photosensor configured to receive a second light signal from the precipitation at a second time point, wherein the first and second photosensors are vertically spaced by a first distance; and
    a controller configured to: (i) calculate an amount of time between the first light signal and the second light signal; and (ii) calculate, based on the first distance and the calculated amount of time between the first light signal and the second light signal, a terminal velocity of the precipitation, wherein the controller is further configured to identify, based on the terminal velocity of the precipitation, the type of precipitation.

7. The lighting unit of claim 6, wherein the controller is further configured to communicate the identified type of precipitation.

8. The lighting unit of claim 6, wherein the controller is further configured to determine, based on the received first and second light signals, an intensity of the precipitation.

9. The lighting unit of claim 6, wherein the controller is further configured to modify, in response to a determined type of precipitation, the light source.

10. The lighting unit of claim 6, further comprising a second light source, wherein the first light source emits light of a first wavelength, and the second light source emits light of a second wavelength.

11. A lighting unit configured to detect precipitation the device comprising:
    a photosensor configured to receive a first reflected light signal from the precipitation at a first time point and a second reflected light signal from the precipitation at a second time point;
    first optics configured to direct the first reflected light signal from the precipitation at the first time point to a first portion of the photosensor;
    second optics configured to direct the second reflected light signal from the precipitation at the second time point to a second portion of the photosensor, wherein the first and second portions of the photosensor are vertically spaced by a first distance; and a controller configured to: (i) calculate an amount of time between the first light signal and the second light signal; and (ii) calculate, based on the first distance and the calculated amount of time between the first light signal and the second light signal, a terminal velocity of the precipitation, wherein the controller is further configured to identify, based on the terminal velocity of the precipitation, the type of precipitation.

12. The lighting unit of claim 11, wherein the controller is further configured to determine, based on the received first and second light signals, an intensity of the precipitation.

* * * * *